United States Patent

[11] 3,616,409

[72] Inventor Daniel C. Tosteson
  Durham, N.C.
[21] Appl. No. 735,286
[22] Filed June 7, 1968
[45] Patented Oct. 26, 1971
[73] Assignee Duke University, Inc.
  Durham, N.C.

[54] ELECTRODE SYSTEM FOR MEASURING ION ACTIVITIES IN STREAM OR SAMPLE
  2 Claims, 12 Drawing Figs.
[52] U.S. Cl. .................................... 204/195, 128/2.1, 204/1 T
[51] Int. Cl. ....................................... G01n 27/30, G01n 27/40
[50] Field of Search ............................ 204/195, 1.1; 128/2.1

[56] References Cited
UNITED STATES PATENTS
3,088,905   5/1963   Glover ........................ 204/195
3,272,725   9/1966   Garst .......................... 204/195 X
3,505,196   4/1970   Dahms ........................ 204/195

OTHER REFERENCES
D. C. Tosteson et al., The Journal of General Physiology, Vol. 51, No. 5, Part 2, pp. 373–384, (1968).
Paul Mueller et al., Biochemical and Biophysical Research Communications, Vol. 26, No. 4., pp. 398–404, (1967).
Z. Stefanac et al., Microchemical Journal, 12, pp. 125–132, (1967).
Thomas E. Andreoli et al., Journal of General Physiology, Vol. 50, pp. 1729–1747, (1967).
A. A. Lev et al., Tsitologiya, Vol. 9, No. 1, pp. 102–106, (1967).
Paul Mueller et al., Journal of Physical Chemistry, pp. 534–535, Vol. 67, (1963).

Primary Examiner—G. L. Kaplan
Attorney—B. B. Olive

ABSTRACT: Continuous measurement of the activity of a particular chemical species of ion in a continuously flowing aqueous solution is obtained in a closed electrode system in which the flow is directed past a sensing electrode, the sensing electrode being convertible to measuring similar activity in static solutions. The selective element embodies a mechanically stable layer which contains an ion selective macrocyclic compound and which layer is established by a surface active agent between the aqueous solution and a nonaqueous phase, the agent and compound being dissolved in a solvent to form the nonaqueous phase.

INVENTOR.
Daniel C. Tosteson

BY

B. B. Olive
ATTORNEY

INVENTOR.
Daniel C. Tosteson

INVENTOR.
Daniel C. Tosteson

3,616,409

ELECTRODE SYSTEM FOR MEASURING ION ACTIVITIES IN STREAM OR SAMPLE

CROSS-REFERENCE TO RELATED APPLICATION

This application is related to a copending application Ser. No. 692,065, entitled "Electrode for Measuring Potassium and Other Specific Ion Activities," filed Dec. 20, 1967 in that both applications are based on employment of a sensing layer having the selective character of a macrocyclic compound.

BACKGROUND OF THE INVENTION

1. Field of the Invention

The invention described herein was made in the course of or under a grant from the National Science Foundation, an agency of the United States Government.

The invention may be said to relate broadly to the measurement of the activity of a particular chemical species of ion in an aqueous solution which also contains other species and which solution may be flowing or static. More specifically the invention relates to apparatus and associated compounds used to establish ion selectivity and to measure ion activity and sometimes referred to as ion electrodes, ion selective electrodes, ion activity electrodes, ion exchange membranes or electrochemical cells. The invention is uniquely applicable to the measurement of potassium ion activity in a stream or static sample of aqueous solution.

2. Description of the Prior Art

Various methods and apparatus have been employed for the measurement of ion activity. While potentially applicable to the measurement of other ion activities and to measurement in static solutions, the invention is known to be particularly useful for the continuous measurement of potassium ion activity in a stream of aqueous solution. The discussion of the prior art practices is therefore limited to a discussion of prior art practices with respect to potassium ion activity and primarily to those directed to analysis of discrete samples. From such discussion it is believed that those skilled in the art will readily see the relation of the prior art to the application of the invention to continuous flow measurements, to measurement of discrete samples and to measurements of ionic activities other than potassium.

It has long been recognized that potassium ions play a vital role in many physiological processes. For example, the resting electrical potential difference (resting potential) between the inside and outside of most excitable cells (e.g. nerve cells; skeletal, smooth and cardiac muscle cells) is dependent on the facts that the nerve ion concentration is much higher in the intracellular than in the extra-cellular fluid and that the surface membrane of these cells when they are at rest is much more permeable to potassium than to other cations. Indeed, the magnitude of the resting potential in such cells has been shown to depend in large part on the ratio of intracellular to extra-cellular potassium ion concentration. Since excitability is, in turn, dependent on the magnitude of the resting potential, it is evident that small changes in the concentration of potassium ions in the extra-cellular fluid have profound effects on the activity of nerve and muscle cells. For example, an increase in the concentration of potassium ions in extra-cellular fluid (e.g. blood plasma) from the normal value of 4–5 mM to 8–9 mM can produce complete loss of excitability of cardiac muscle cells and thus cessation of the pumping action of the heart. While changes in potassium ion concentrations in the human body are slow and normally are expressed in terms of hours, the significance of such changes are marked. For this and other important reasons a continuing knowledge of the concentration of potassium ions in blood plasma is of great importance to physicians in the management of many clinical disorders such as acute and chronic renal disease, endocrine diseases such as adrenal insufficiency and diabetes mellitus, disturbances of fluid balance produced by vomiting and diarrhea, circulatory shock, digitalis intoxication, etc. Therefore, the availability of a rapid, direct method for the continuous measurement or monitoring of potassium activity in moving streams of biological fluids such as provided by this invention is of significant interest to biological, physiological, biochemical and pharmacological research, as well as to clinical medicine.

Potassium ion concentrations in static biological and other aqueous fluid samples have been measured previously by precipitation methods and by flame emission and atomic absorption photometry. These procedures require considerable sample preparation and manipulation and are therefore time consuming. They are not directed to monitoring a continuous flow. Furthermore, they measure the amount of potassium ion present in the sample rather than the activity of the ion in the solution analyzed. Attempts to formulate glass electrodes which are selective for potassium ions have been carried out in a number of laboratories. If they were sufficiently selective, these electrodes would permit rapid, direct determination of potassium ion activity. However, it has proved impossible to make glass electrodes with a selectivity ratio for potassium to sodium of greater than 10 to 1. Since the concentration of sodium ions in human blood plasma is 30 times greater than the concentration of potassium ions, these glass electrodes are not suitable for measuring potassium ion activity in such fluids either by sample or by monitoring of a continuous flow.

Within the past year, several laboratories have reported that certain macrocyclic compounds, e.g., valinomycin, enniatin B, nonactin, monactin, dinactin, confer marked selectivity for potassium over sodium on thin (ca. $10^{16}$ cm.) lipid bilayer membranes prepared from pure lecithin, mixed brain lipids, and sheep red cell lipids. The electrical potential difference across such thin membranes responds instantaneously to changes in the ratio of potassium ion concentrations in the aqueous phases bathing the two sides of the membrane. Nevertheless such thin bilayer membranes are not suitable for the practical measurement of potassium ion activities because of their extreme mechanical fragility. However, these investigations made clear the remarkable selectivity for potassium over sodium (as great as 1,000 to 1) which certain macrocyclic compounds produce in thin bilayers of phospholipid. Also within the past year a report has appeared which describes attempts to make a potassium ion sensitive electrode by filling a sintered glass disc or other supporting medium with a solution of monactindinactin in benzene or carbon tetrachloride. Such electrodes show striking selectivity for potassium over sodium ions but are extremely sluggish in response, requiring several hours to reach a steady potential after a change in the potassium ion activity in the test solution. These kinetic characteristics make electrodes of this type unsuitable for practical measurements of potassium ion activities. None of the recent prior art has suggested the applicability of such selective electrodes to a closed, continuous monitoring system, nor to an optional flow-static system.

SUMMARY OF THE INVENTION

The invention of applicant's referred to in copending application Ser. 692,065 is directed to ion selective electrodes which measure the activity of a particular chemical species of ion in an aqueous solution sample containing other species of ions, the operation of which is based on the principle that an electromotive force is developed at an interface established between the aqueous solution and a nonaqueous phase and being established by a surface active agent, said interface also containing an ion selective macrocyclic compound, said agent and compound being dissolved in a solvent which forms the nonaqueous phase, the magnitude of said electromotive force being dependent on the activity of the ion being measured, a change in said electromotive force being developed rapidly after a change in the activity of the ion in the aqueous solution, said change in electromotive force being measured by conventional means involving reversible half cells and a high impedance potentiometer. More particularly, it has been discovered that an interface established by a surface active agent such as the phospholipid lecithin, said interface also containing an ion selective macrocyclic compound such as a cyclic depsi-peptide (e.g. valinomycin) or a cyclic ester (e.g. nonactin, monactin, dinactin), gives rise to an electromotive force the magnitude of which depends on the potassium ion activity in the aqueous solution bathing one side of said interface, said interface being located at the surface of contact between said aqueous solution and a nonaqueous, oil phase made up of a nonpolar solvent such as decane in which the phospholipid and macrocyclic compound are dissolved. The invention of the copending application is directed solely to discrete sample and not to continuous measuring. Consequently, detection of changes in activity between samples requires emptying and refilling of the sample chamber. Nevertheless, the described sensing interface or layer gives a very rapid response and has been found applicable to the present invention.

The present invention embodies the same type of sensing interface or layer as in the copending application and in what might be described as a "flow cell" through which the aqueous solution having the ion activity of interest is pumped as a continuous flowing stream. The flow cell establishes electrode contact with the stream of aqueous solution as it flows through the cell and the ionic activity of interest is continuously monitored or measured utilizing an electrode construction having a sensing interface or layer of the type taught by the copending application. The flow cell reference solution as well as the membrane forming solution remains static and nonflowing and the entire flow cell operates essentially as a closed system. Pumping pressure for the continuously flowing aqueous solution may come from the source itself as from a blood vessel or may come from an auxiliary finger pump or the like. In either case, because the system is closed from atmospheric pressure the effect of fluctuations in aqueous solution pumping pressure have minimal effect on the mechanical stability of the very critical detecting layer. Furthermore, the sensing electrode structure of the invention calls for an extremely small size and therefore an inherently mechanically stable sensing layer. Another aspect of the physical structure of the flow cell is that any tendency for KCl contamination from the bridge of the sensing electrode to reach either the sensing layer or the solution being measured is avoided by locating the sensing electrode downstream and remote from the sample solution chamber and its sensing layer. The rate of flow which may range between one-half cubic centimeter to 10 cubic centimeters per minute, is maintained within limits designed to maintain continuous flow while remaining within the diffusion capacity of the sensing layer. While it might have been expected that the sensing layer would lose its mechanical stability and that its response would be incompatible with monitoring a continuously flowing stream such has not proven to be the case. A further embodiment allows alternate use with a stream or discrete sample.

An object is therefore to provide a rapidly responsive system for continuously measuring a specific ion activity in a flowing stream or static sample of aqueous solution.

Another object is to provide a closed ionic activity measuring system for a flowing stream of aqueous solution utilizing a macrocyclic compound like sensing layer which layer is essentially self-washing and mechanically stable under pumping pressure.

Other objects will appear from the description and drawings:

DESCRIPTION OF THE DRAWINGS

FIG. 5 illustrates the cell in use while

DESCRIPTION OF THE PREFERRED EMBODIMENTS

Figure 6:
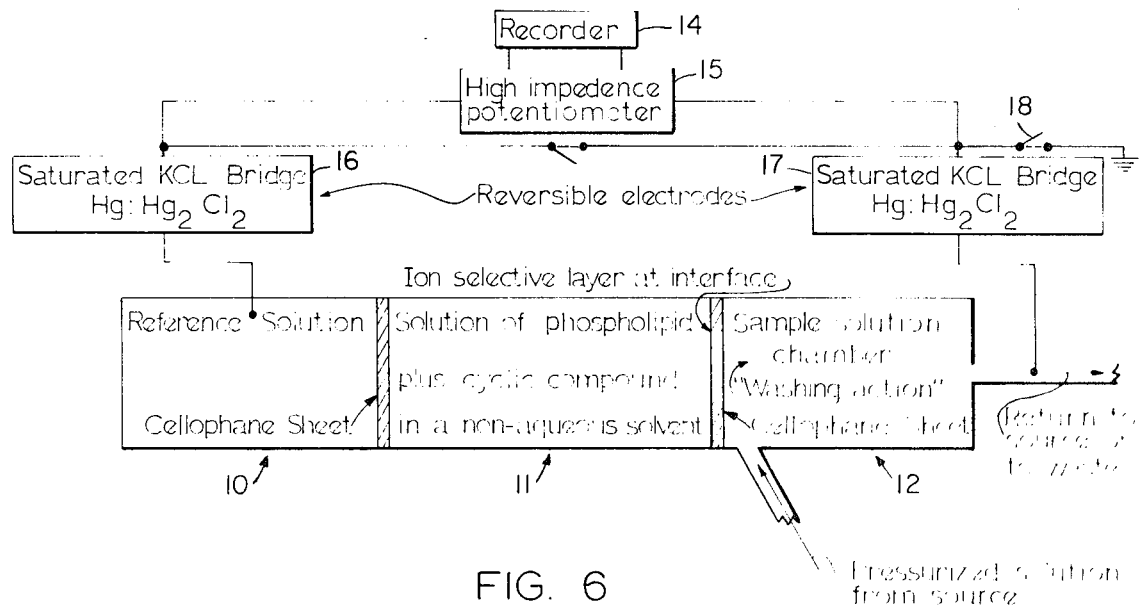
FIG. 6 is the circuit.

In the embodiment of the invention illustrated by the generalized diagram of FIG. 6 the "flow cell" of the invention may be considered to be a composite "electrode" in the sense such term is used in the art and includes a chamber 10 holding a static, aqueous reference solution, a further chamber 11 holding a static, lipid membrane forming solution consisting, for example, of a phospholipid and a macrocyclic compound dissolved in a nonaqueous phase and a further chamber 12 through which flows the aqueous sample solution of interest, the static membrane forming solution being held between the static reference and moving sample solutions. Electrical connections between the two aqueous solutions and the measuring instrument 15, a high impedance potentiometer, and associated recorder 14 are established through conventional reversible electrodes 16, 17 ($H_g:H_gCL_2$ or $A_g:A_gCL$) having the usual KCl bridges. The two aqueous solutions comprise the referred to reference solution whose ionic composition is maintained constant and the flowing sample solution the potassium ion activity of which is to be measured. The lipid membrane forming solution is, in this embodiment, confined between a pair of spaced cellophane membrane support sheets and may consist of a solution of phospholipid and macrocyclic compound dissolved in a nonaqueous solvent e.g., decane, the chemical nature of a suitable phospholipid, macrocyclic compound and solvent being as described in the copending application.

To complete the description of the generalized diagram of FIG. 6, it will be noted that the reversible electrode 17 in the sample solution which connects to one side of the potentiometer is "downstream" and remote from sample chamber 12 and may or may not be connected to electrical ground as indicated depending on the particular application. This downstream arrangement has been found to eliminate any possible contamination caused by leakage from the KCl bridge associated with electrode 17. The reversible electrode 16 in the reference solution may be connected either to the other side of the potentiometer 15 during measuring or to ground during nonmeasuring periods, a switch 18 being provided for this purpose.

Reversible electrodes suitable to the invention may be calomel electrodes with KCl bridges and of the standard Beckman fiberjunction type. A Varian potentiometric recorder is preferably connected through a zero gain, impedance matching preamplifier, such as the Keithly Model 300, having a nominal input impedance of $10^{13}$ ohms. While various suitable nonaqueous membrane forming solutions are described in the copending application one such solution was made by dissolving crude soybean lecithin(Centrolex C. Lecithin, Central Soya Company) in n-decane to give a final concentration of 30 mgm lecithin/ml. Monactin (67 percent) dinactin (33 percent) (supplied by the Squibb Research Institute) was added to the phospholipid-decane solution to give a final concentration of 0.3 mgm of the macrocyclic ester per ml. Both the aqueous sample and reference solutions were unbuffered with a pH of 5.5 to 6.0. The $K^+$ concentration in the reference solution was 0.01M.

Reference will be made later to certain macrocyclic polyether compounds that may be employed to establish the desired ion selective layer. However, prior to discussing such compounds the physical structure will be described in more detail.

Figure 1:
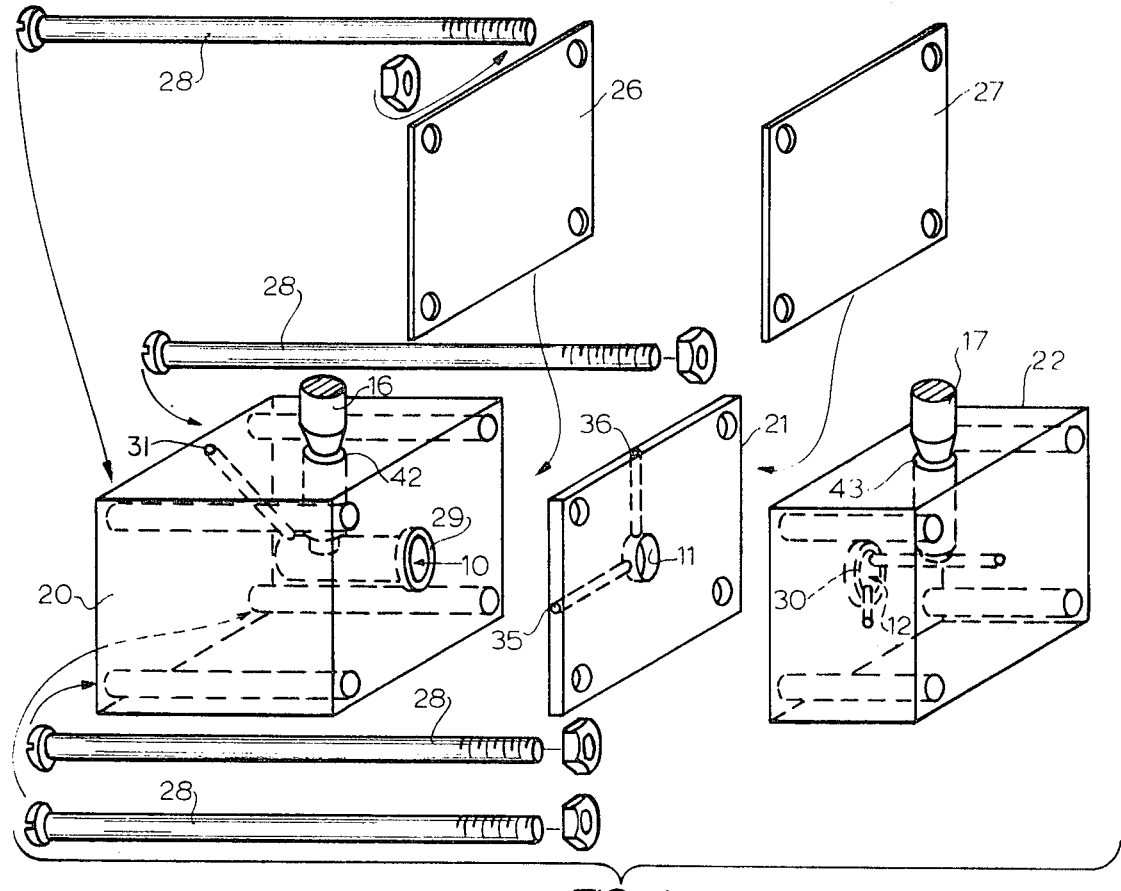
FIG. 1 is an exploded view.
Figure 2:
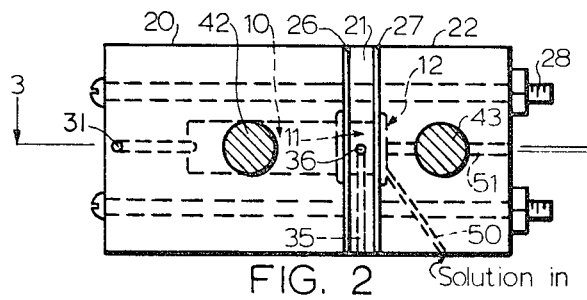
FIG. 2 is a plan assembled view and FIG. 3 is a section view on line 3—3 of a first embodiment.
Figure 4:
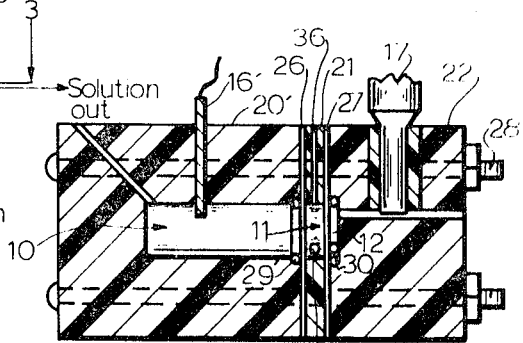
FIG. 4 is a section view of a second embodiment.
Figure 3:
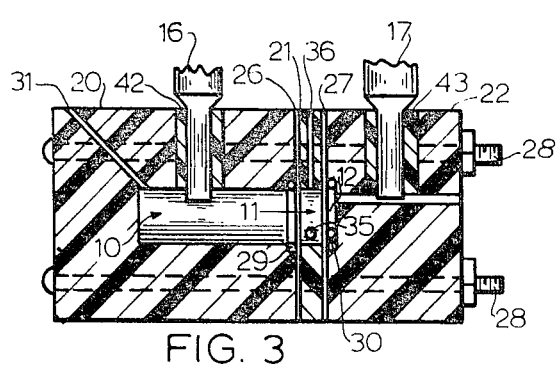

A structure suitable to holding the static aqueous reference solution, to providing a sample chamber and flow path for the moving sample solution, and to holding the static nonaqueous membrane forming solution is illustrated in FIGS. 1, 2 and 3 in one embodiment and in FIG. 4 in an alternate embodiment.

Three chamber blocks 20, 21 and 22 provide the chamber 10 for the reference solution, the chamber 12 for the sample solution and the chamber 11 for the phospholipid, macrocyclic compound-decane solution (hereafter called PMD solution) which establishes the desired ion selective membrane. Blocks 20, 21 and 22 may be made of various material. While not limited to such materials it may be said generally that nonconducting, mechanically rugged plastic is suitable. It should be expected that satisfactory results will be obtained in most applications when block 21 is made of nonpolar or hydrophobic material whereas blocks 20, 22 will generally operate whether made of polar e.g., glass or nonpolar materials, e.g., Lucite, Teflon, polyethylene or polypropylene. From the latter description and examples, those skilled in the art will more readily appreciate the wide choice and controlling considerations in selecting materials for the block constructions.

The size of the chambers is essentially not critical and can be said to be determined primarily by the desired convenience in handling the solutions, by the desired flow rate and by the tolerable electrical resistance of the overall system. To enhance the mechanical stability of the sensing layer it is desirable however that the sample solution chamber 12 and the sensing layer itself be of minimum size because of the continuous washing action caused by the moving sample solution and so as to minimize opportunity for the layer to collapse or otherwise be destroyed. In one embodiment the sample chamber is reduced to a volume of 0.1 milliliter and satisfactory results are obtained even under maximum flow as later discussed. Selective chamber 11 is bounded on both sides by two membrane support sheets 26, 27 which also provide boundaries on one side for each of the other chambers 10 and 12. Sheets 26, 27 serve multifold purposes. Considering that ordinary porous cellophane sheet material is suited for such purposes it can be noted that membrane support 27 in particular stabilizes the ion selective membrane formed therein, that the membrane supports permit rapid access or contact between the aqueous and nonaqueous phases and in particular permit access of the potassium ions in the flowing sample aqueous solution to the surface of the interface with the static nonaqueous PMD solution, present a polar surface and prevent access to the surface of the nonaqueous phase of macromolecules, e.g., proteins, and particles, e.g., red blood cells, which might be contained in the moving sample aqueous solution. From the multifold purposes served it can be seen that various materials may be suited to fulfilling the requirements for membrane supports 26, 27 and that cellophane presents a simple and practical choice.

The three blocks are held tightly together by means of the bolts 28. The sample solution chamber 12 and reference solution chamber 10 are recessed to receive a pair of rubber 0 rings 29, 30 which assist in insuring a tight seal between the respective chambers and the two cellophane membrane supports. Passage 31 provides access to the reference chamber for the admission and removal of reference solutions. It may be noted in this regard that a typical reference solution is normally only infrequently changed. That is, in the present invention relatively large volumes of sample solution may be pumped through the flow cell, the ionic activity measured and without requiring any change in quality or quantity of reference solution. Access to the selectivity chamber 11 is provided by a lateral passageway 35 and an upper passageway 36, passageways 35, 36 being adapted to receive valved needles and tubes, not shown, for admitting and removing the PMD selectivity solution. The conventional reversible electrodes 16, 17 mount in corresponding passages 42, 43. In regard to electrode 17 and sample chamber 12 it may be noted that the aqueous solution to be measured is admitted to chamber 12 by an angled, horizontal, passageway 50 and is discharged through a horizontal passageway 51. Such an arrangement has been found to produce a desirable washing effect and a flow path within chamber 12 effective to provide a continuously changing solution within chamber 12 and in the electrical and physical flow path entering between electrode 17 and chamber 12. Furthermore, in the event of leakage from the KCl bridge of electrode 17, such solution contamination as might result is removed from the flow cell as fast as it is produced because of the direction of flow and does not reach chamber 12 because of the downstream location of electrode 17.

Figure 5:
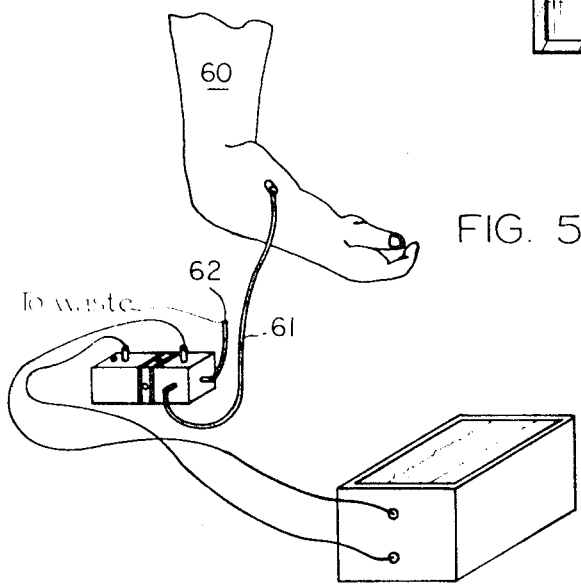

FIG. 5 illustrates somewhat schematically use of the flow cell for the continuous monitoring of the potassium ion activity in human blood obtained from the patient's arm 60 and passed to and from the cell through suitable intake and exhaust conduits 61, 62. The patient might for example be undergoing surgery or in another example could be a patient in postoperative intensive care unit. A further example would be a type of patient undergoing either medication procedures or observation extending over many hours or days. In any of these cases it can be seen that the invention provides a means for monitoring the selected ion activity on a continuous basis and without disrupting the normal body processes.

Figure 12:
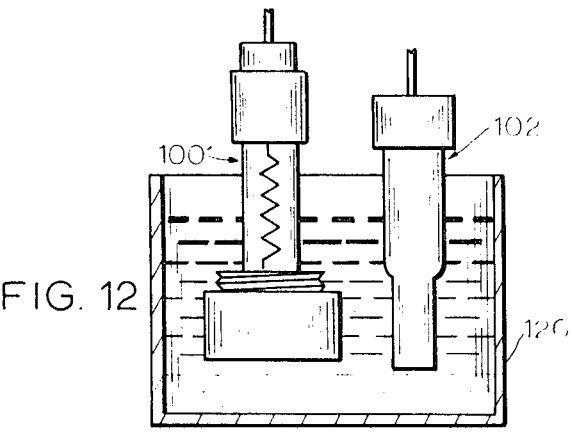
FIG. 11 is a section view of the assembled dip stick electrode and FIG. 12 shows it in use.

The most widely used type of sensing electrode is the type known as the dipping electrode, sometimes referred to as a dipstick type. This type of electrode is useful in many laboratory applications. A typical use is that of putting an appropriate ion sensing electrode and a conventional reference electrode in a beaker containing a discrete sample of the solution of interest and making the desired measurement as in FIG. 12. Because of the widespread practice and need for making measurements of ionic activity in discrete samples it is apparent that the present invention or at least the sensing electrode portion would be more useful if applicable to both static and flow measurements. Such as alternate embodiment is shown in FIGS. 7 through 11 in which a flow cell basically similar to the flow cell just described in reference to FIGS. 1 through 6 utilizes an ion activity sensing electrode the major portion of which can be used either for flow or static sensing Convertibility from one form of sensor to the other requires only the addition or removal of a simple cap structure.

Figure 7:
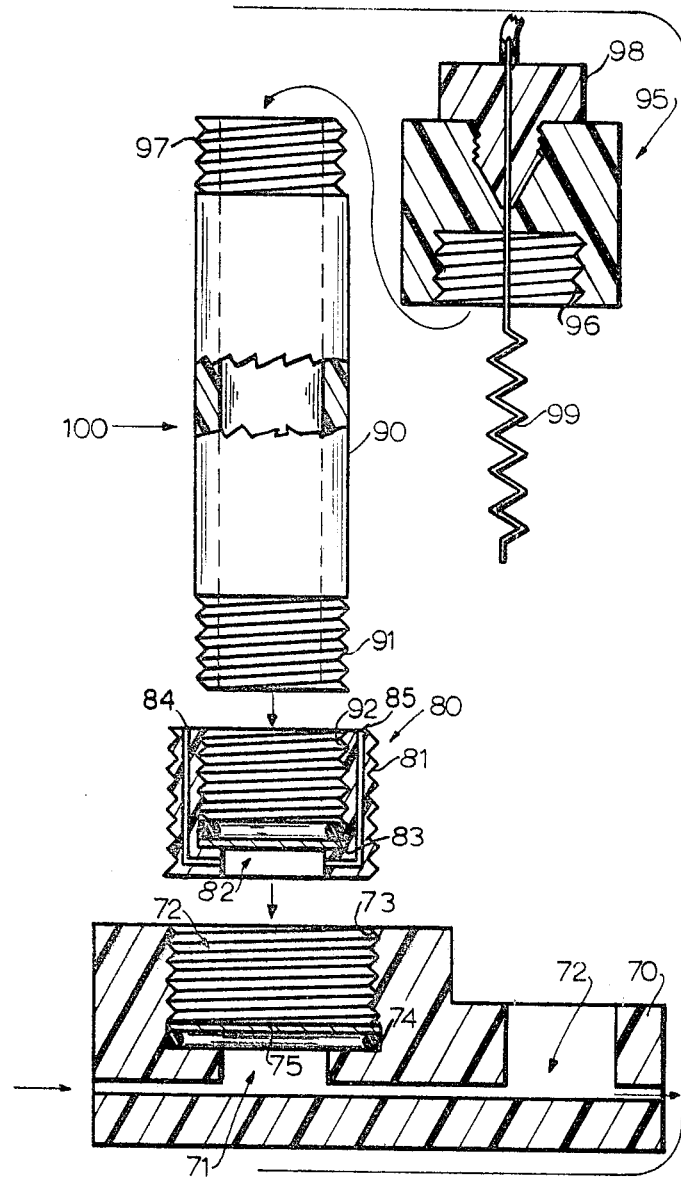
FIG. 7 is an exploded section view of a third embodiment.

Referring next to FIG. 7, the alternate structure is first explained for flow measuring. A solid block 70 provides a chamber 71 and a chamber 72. Block 70 may be formed of the same materials employed for blocks 20 and 22 of the first embodiment. Above chamber 71, block 70 further provides a cylindrical receptacle 72 having internal threads 73 and which is adapted to receive an O-ring 74 for sealing purposes and above this a cellophane sheet 75 which provides the sole barrier between receptacle 72 and chamber 71. A cylindrical plug 80 is adapted by means of external threads 81 to be screwed into place in receptacle 72 in sealing relation against cellophane sheet 75. Plug 80 should preferably be formed of the same kind of material as previously described for block 21 of the first embodiment. Plug 80 provides a chamber 82 adapted to receive the PMD membrane forming solution, chamber 82 being defined by a cellophane sheet 83 and the previously mentioned cellophane sheet 75. Sheets 75 and 83 should meet the same general requirements as sheets 26,27 of the first embodiment. Access to chamber 82 is provided by means of passageways 84,85 which are normally stoppered or otherwise closed but which may be used for making complete or partial changes of the PMD solution.

The conventional reference solution associated with the sensing electrode portion of the embodiment of FIG. 7 is confined in a cylindrical tube 90 having external threads 91 at its lower end which mate with internal threads 92 of plug 80. This reference solution may be the same as previously prescribed for the first embodiment in reference to chamber 10 of the first embodiment. The upper end of tube 90 receives a cap 95 having internal threads 96 mating with external threads 97 of tube 90. Cap 95 in turn receives a threaded cap 98 which supports an electrode wire 99 which may for example comprise a typical silver-silver chloride composition. The various components just described can be seen to form a composite sensing electrode to be designated 100.

Figure 8:
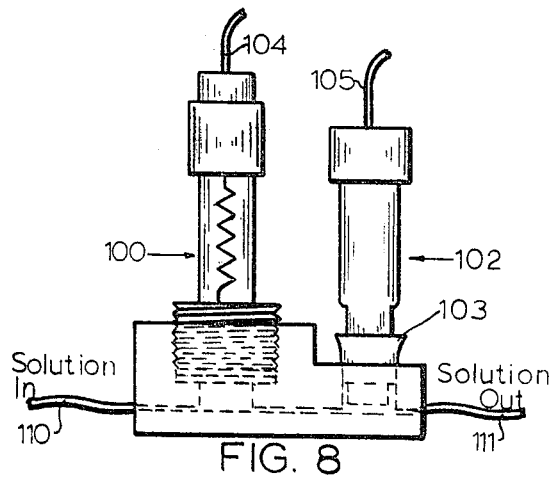
FIG. 8 shows the third embodiment with a reference electrode added.
Figure 10:
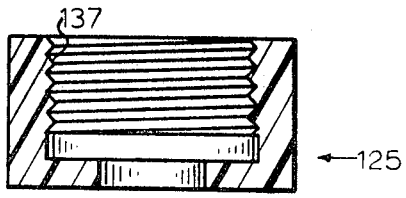
FIG. 10 is a section view of a cap employed to convert the sensing electrode of FIG. 7 to a dip stick type electrode.
Figure 9:
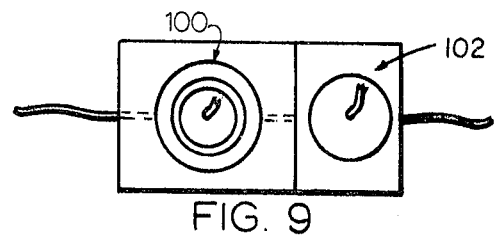
FIG. 9 is a plan view of the embodiment shown in FIG. 8.

As best shown in FIGS 8 and 9, the alternate embodiment when employed to measure ion activity in flowing solutions involves the installation in block 70 of a conventional reference electrode generally shown at 102 held by a stopper 103 with appropriate electrical connections being made through lead wires 104, 105. In operation with a flowing solution having an ion activity to be measured, the solution enters through an appropriate conduit 110 and fills chamber 71 causing the solution to bathe and induce a self-washing action against the cellophane sheet 75 through which ion sensing is effected by means of the ion selective layer formed by the PMD solution confined in chamber 82. The measured solution completes electrical contact by filling chamber 72 in which is located a reference electrode 102 and the waste solution leaves through conduit 111.

The general operation of the alternate embodiment being described will of course be understood as being similar to the operation of the first embodiment when applied to flowing solutions. It will be observed however that whereas in the first embodiment the ion selective layer is formed and mechanically stabilized while confined in a vertical plane under pumping pressure and the solution washing action, the ion selective layer in the alternate embodiment is held and stabilized under the same conditions while confined in a horizontal plane. Somewhat unexpectedly it has been found possible to maintain the mechanical stability of the ion selective layer in either operation and over substantially long periods of use. That is, the washing action against the cellophane sheet membrane at which the ion selective layer is formed when held within the flow rates previously indicated does not tend to destroy the mechanical stability of the selective layer whether oriented vertically or horizontally nor is it apparent that either orientation introduces any kind of migration or other disruptive action on the very critical sensing layer.

Figure 11:
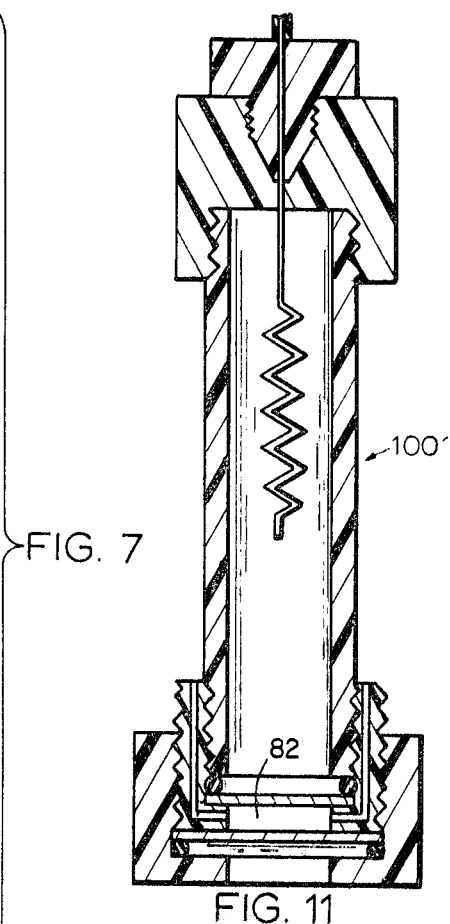

Of particular interest to the second embodiment is the fact that the sensing electrode 100 can be easily removed from block 70 and the auxiliary cap 125 installed on the end of plug 80 to form a dip stick type electrode 100' as shown in section in FIG. 11. That is, when dip stick electrode 100' is mated with the conventional reference electrode 102 as in FIG. 12, the selected ion activity may be measured in a static solution such as might be contained in beaker 126. Referring particularly to FIG. 11 it will be seen that a chamber 82', comparable to chamber 82 of FIG. 7, is formed when cap 125 is fitted on plug 80 by means of mating threads 137 on cap 125 and threads 81 on plug 80. Cap 125 should preferably be formed of the same kind of material as employed for block 70. Chamber 82' of course receives the PMD solution and the remaining parts of the sensing electrode in the dip stick form 100' operate and serve the same purposes previously explained in connection with the flow cell electrode form 100.

From the foregoing it can be seen that the invention enables the user by purchasing the basic flow cell structure to acquire means by which both static and flowing solutions may be measured for ion activity. The same conventional reference electrode may be employed in either mode and the basic sensing electrode structure may be employed in either mode simply by the addition or removal of a simple cap structure, that is cap 125. The flow cell mode of operation retains all of the operating advantages previously set forth with reference to the first embodiment of the invention and in addition, as just mentioned, allows the operator who is familiar with the usual dip stick to have such form of measuring device available.

To return to the subject of PMD solutions, it may be noted that in addition to the macrocyclic compounds mentioned heretofore in this and in the copending application, it has also been found that at least some macrocyclic polyether compounds will produce the results desired. In particular, a macrocyclic polyether synthesized by C. J. Pedersen of the Elastomer Branch of E. I. duPont deNemours and Company, Inc. has been successfully employed and it can be observed that the selected polyether (hereafter referred to as XXX–I) operates as an ion selective medium by exhibiting the capability of forming complexes with the potassium ions. The particular composition has been designated XXX–I and has been identified as containing 18 ring atoms and 6 ring oxygens. Pedersen refers to this class of compounds as crown compounds and in his nomenclature this composition is dicyclohexyl-18 crown 6. Reference may be made to the following literature reference for further identification: "Cyclic Polyethers and Their Complexes with Metal Salts," Journal of American Chemical Society, Volume 89, Pages 7,017–7,036, 1967 by C. J. Pedersen. When the composition XXX–I was present in the previously mentioned lecithin-decane mixture in a concentration of 10 millimoles per liter, it produced essentially the same electrode responses to those observed when the nonaqueous phase contained 0.01 milligrams of nonactin per milliliter of lecithin-decane. Thus with both the flow cell as well as the dip stick mode of operation, the invention gives a wide choice of macrocyclic compounds with which to form the selective solution and thereby form the ion selective layer. Furthermore it will be noted from the preceding description that the aqueous solution being measured for the selected ion activity will produce a very rapid response irrespective of whether the solution being measured is under pressure induced by a pump, a human or animal heart or by gravity or instead is in a static condition. Furthermore, the orientation of the sensing layer whether vertical or horizontal offers no obstacle to employment of the invention. Given this operating versatility and the wide range of materials that may be employed to make up the physical structure of the electrode of the invention, it can be seen that both the user and the manufacturer are given a wide range of equivalent operating forms of the invention.

What is claimed is:

1. An electrode system for measuring the activity of selected ions in a continuous stream of aqueous solution flowing under predetermined pressure from a source, comprising: a. a container establishing a holding chamber of predetermined volume and having nonconductive non polar wall surfaces and an open end; b. conduit means adapted to be connected to said source and providing a flow path for said stream through said container and past said holding chamber open end at a predetermined rate of flow then to a point of discharge; c. a nonaqueous hydrophobic solvent containing both a surface active phospholipid agent and macrocyclic compound in a selective electrode thick layer forming solution located in said holding chamber, said macrocyclic compound being selected from the group consisting of monactin, nonactin, dinactin, trinactin, valinomycin, enniatin B, and a polyether macrocyclic compound exhibiting the capability of forming complexes with potassium ions, said agent, macrocyclic compound and solvent being selected, proportioned and located in said holding chamber to form a bulk phase such that when in solution together in a static state and placed in operative association with said aqueous solution in a moving state in a manner allowing said static electrode forming solution to have layer contact with said moving aqueous solution, said layer exhibits the character of being highly selective with respect to said selected ions and is productive of a measurable voltage which appears across said layer and said bulk phase and layer exhibit sufficiently low electrical resistance permitting substantially immediate response to the activity of said selected ions as well as changes in said activity; d. membrane means mounted on said container and effective at said stream pressure and rate of flow to retain said electrode solution static and within said holding chamber on one side of said membrane means and to establish and mechanically stabilize said layer across said chamber open end while maintaining said layer contact, on the opposite side of said membrane means, with a portion of said moving pressurized stream; and e. voltage measuring means arranged to continuously measure said voltage as a function of said activity during the flow of said stream.

2. A system as claimed in claim 1 wherein said container includes a first base member providing said conduit means and a second member providing said chamber and mounting said membrane means and being removable from the first member, said second member being further formed in the manner of a reference electrode and when removed from said base member being adapted when dipped in a static said aqueous solution to establish said layer contact and produce said voltage, thus adapting said second member for utility in both static and stream measurements.

* * * * *

UNITED STATES PATENT OFFICE
CERTIFICATE OF CORRECTION

Patent No. 3,616,409        Dated October 26, 1971

Inventor(s)   Daniel C. Tosteson

It is certified that error appears in the above-identified patent and that said Letters Patent are hereby corrected as shown below:

In Col. 1, line 47, the word "nerve" should be -potassium-.

In Col. 2, line 26, "(ca. $10^{16}$ cm.)" should be -(ca. $10^{-6}$ cm)-.

In Col. 6, line 30, the word "as" should be -an-.

In Col. 6, line 34, there should be a period after the word "sensing".

Signed and sealed this 9th day of May 1972.

(SEAL)
Attest:

EDWARD M. FLETCHER, JR.  
Attesting Officer

ROBERT GOTTSCHALK  
Commissioner of Patents